United States Patent
Jiang et al.

(10) Patent No.: US 9,473,263 B2
(45) Date of Patent: Oct. 18, 2016

(54) METHOD AND SYSTEM FOR REMOVING A PILOT TONE FROM AN OPTICAL SIGNAL

(71) Applicants: Zhiping Jiang, Ottawa (CA); Zhuhong Zhang, Ottawa (CA); Xuefeng Tang, Ottawa (CA)

(72) Inventors: Zhiping Jiang, Ottawa (CA); Zhuhong Zhang, Ottawa (CA); Xuefeng Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 14/598,581

(22) Filed: Jan. 16, 2015

(65) Prior Publication Data
US 2016/0211938 A1    Jul. 21, 2016

(51) Int. Cl.
*H04B 10/00* (2013.01)
*H04J 14/02* (2006.01)
*H04B 10/077* (2013.01)

(52) U.S. Cl.
CPC ....... *H04J 14/0276* (2013.01); *H04B 10/0775* (2013.01)

(58) Field of Classification Search
CPC .............. H04B 10/0775; H04J 14/0276
See application file for complete search history.

(56) References Cited

U.S. PATENT DOCUMENTS

| | | | | |
|---|---|---|---|---|
| 6,559,984 | B1 * | 5/2003 | Lee .................... | H04B 10/0771 398/5 |
| 2003/0123789 | A1 * | 7/2003 | Miyata ............. | H04B 10/25073 385/24 |
| 2004/0109685 | A1 * | 6/2004 | Wan ................. | H04B 10/25073 398/41 |
| 2006/0274320 | A1 * | 12/2006 | Caplan .............. | G02B 6/2726 356/491 |
| 2007/0264008 | A1 * | 11/2007 | Zaacks .............. | H04J 14/0227 398/3 |
| 2012/0237212 | A1 | 9/2012 | Nishihara et al. | |
| 2015/0288450 | A1 * | 10/2015 | Zhang .............. | H04B 10/2507 398/115 |

FOREIGN PATENT DOCUMENTS

| | | |
|---|---|---|
| CN | 101110761 | 1/2008 |
| EP | 1217862 | 6/2002 |
| JP | 2008245223 | 10/2008 |
| KR | 20030060160 | 7/2003 |

OTHER PUBLICATIONS

International Search report and Written Opinion of corresponding International Appl. No. PCT/CN2015/097781 dated Mar. 14, 2016.
Translation of abstract of cited Chinese reference 101110761.
U.S. patent application publication No. 2003138253 corresponding to cited Korean reference 20030060160.
Translation of abstract of cited Japanese reference 2008245223.

* cited by examiner

*Primary Examiner* — Danny Leung
(74) *Attorney, Agent, or Firm* — Gowling WLG (Canada) LLP

(57) ABSTRACT

The present applies to digital wavelength converters that convert, independently of the format in which optical data may be encoded, an input waveform at a first wavelength to an output waveform at a second wavelength. When operating in an environment where an input waveform has a pilot tone associated thereto, the method and system of the present disclosure allows for the removal of the pilot tone from the input waveform, and also allows for the addition of another pilot to the output waveform.

24 Claims, 9 Drawing Sheets

METHOD AND SYSTEM FOR REMOVING A PILOT TONE FROM AN OPTICAL SIGNAL

FIELD

The present disclosure relates to wavelength conversion in optical networks.

BACKGROUND

Optical communication systems are widely used today for data communication. Such systems typically use optical fibers as the transmission medium to allow high data rates and long distance transmissions. To avoid wavelength blocking and to increase dense wavelength-division multiplexing fill, wavelength conversion can be required at optical cross-connect (OXC) sites.

In such optical communication systems, the use of pilot tones for identifying the wavelength of an optical data signal is known; the pilot tone will generally be a low frequency modulation of the optical data signal. When wavelength conversion of an optical data signal at a first wavelength to an optical data signal at another wavelength is required, the pilot tone also needs to be converted to properly identify this other wavelength. In several wavelength conversion approaches, the pilot tone signal is separated from the optical data signal, which is converted into an electrical signal that is used to modulate a laser emitting light at another wavelength. The conversion of the optical data signal involves extracting the actual data from the optical data signal. The data extraction method will depend on the format of the data (e.g., amplitude-shift keying, phase-shift keying, quadrature amplitude modulation, etc.) and can required extensive processing. A pilot tone of the optical data signal at this other wavelength is generated by applying a wavelength specific modulation to the optical data signal. Additionally, pilot tones can be modulated themselves, e.g., they can be turned on and off at a low rate, for example, 100 bits/s, to carry additional information such as, the modulation format of the optical data signal, the origin of the optical data signal, the optical spectrum width, etc.

Recently, in U.S. patent application Ser. No. 14/270,714, a coherent waveform conversion apparatus that can be used in coherent optical-fiber transmission system has been disclosed. In this system, wavelength conversion is effected on the entire waveform instead of only on the optical data signal. As such, wavelength conversion can be effected without consideration for the format type of the data encoded in the optical signal, which means that there is considerably less processing required. However, when a pilot tone identifying the wavelength of the optical data signal is present at the input of the coherent waveform conversion system, the pilot tone at the output of the coherent waveform conversion system will not properly identify the converted wavelength; rather, it will still identify the wavelength as that of the optical data signal at the input of the coherent waveform conversion system.

Improvements in coherent waveform conversion systems are therefore desirable.

SUMMARY

In a first aspect, the present disclosure provides a method for removing a pilot tone from an optical signal. The method comprises obtaining at least one initial waveform. Once the at least one waveform has been obtained, an intensity waveform is calculated in accordance with the at least one initial waveform. Subsequently, the intensity waveform is processed to obtain a pilot tone frequency of the pilot tone, a modulation depth of the pilot tone, and a phase of the pilot tone. Compensated waveforms are then multiplied with a pilot tone cancellation factor. The pilot tone cancellation factor is a function of the pilot tone frequency, the modulation depth, and the phase of the optical signal.

In a second aspect, the present disclosure provides an apparatus for removing a pilot tone from an optical signal. The apparatus comprises a pilot tone processing unit that has an input section, a processing section, and an output section. The input section is to obtain at least one initial waveform. The processing section of the pilot tone processing unit calculates an intensity waveform in accordance with the at least one initial waveform. The processing unit processes the intensity waveform to obtain a pilot tone frequency of the pilot tone, a modulation depth of the pilot tone, and a phase of the pilot tone. The processing unit calculates a pilot tone cancellation factor as a function of the pilot tone frequency, the modulation depth, and the phase. The output section outputs the pilot tone cancellation factor. The apparatus also comprises multipliers that receive the pilot tone cancellation factor and that multiply compensated waveforms with the pilot tone cancellation factor.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for removing a pilot tone from an optical data signal. The method and system are applied to digital wavelength converters that convert, independently of the format in which optical data may be organized, an input waveform at a first wavelength to an output waveform at a second wavelength. When operating in an environment where an input waveform has a pilot tone associated thereto, the method and system of the present disclosure allows for the removal of the pilot tone from the input waveform, and also allows for the addition of another pilot to the output waveform. This other pilot tone correctly identifies the wavelength of the output waveform.

Figure 1:
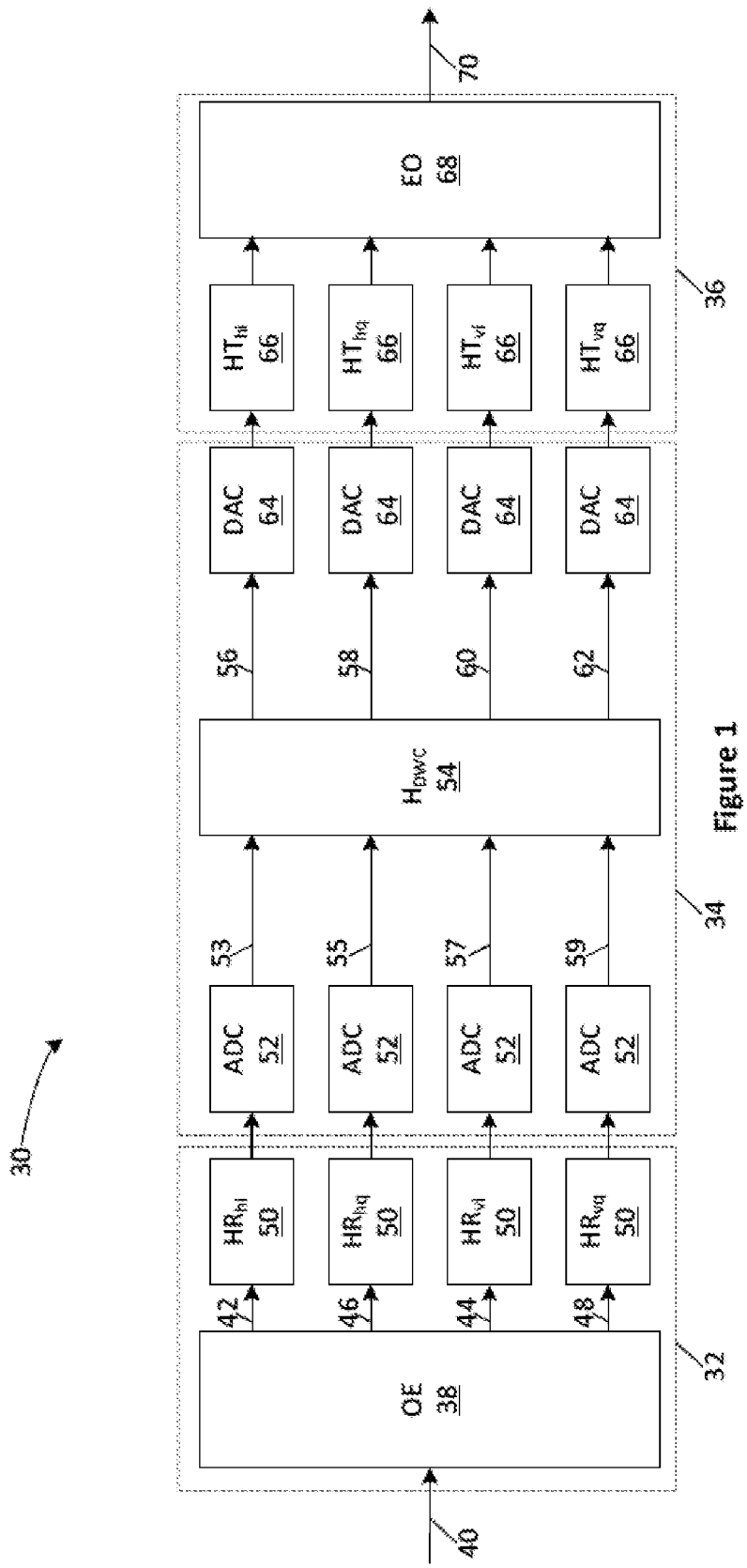
FIG. 1 shows a prior art wavelength converter.

FIG. 1 shows a prior art wavelength converter 30, which comprises a coherent receiver 32, a digital waveform converter (DWC) unit 34, and a coherent transmitter 36. An optical-to-electrical (OE) converter 38 converts an input optical signal 40 into two in-phase (I) analog electrical signals and two quadrature-phase (Q) analog electrical signals. The two in-phase analog electric signals include signal 42, which represents the in-phase, horizontal polarization component of the electric field of the input optical signal, and signal 44, which represents the in-phase, vertical polarization component of the electric field of the input optical signal. The two quadrature-phase analog electric signals include signal 46, which represents the quadrature-phase, horizontal polarization component of the electric field of the input optical signal, and signal 48, which represents the quadrature-phase, vertical polarization component of the electric field of the input optical signal.

The signals 42, 44, 46, and 48 are fed into respective filters 50 that each output a filtered analog signal to the DWC 34. Each filter 50 may include an amplifier and a transmission line that will typically have low-pass characteristics. In practice, the filters 50 may be imperfect and defects or distortions may be introduced when generating the filtered analog signals. Each of the four filtered analog signals is received by the DWC unit 34 at a respective analog-to-digital converter (ADC) 52. The ADCs 52 output four digital signals or waveforms 53, 55, 55, and 59.

The DWC 34 also comprises a digital compensation filter 54 that receives the four digital signals or waveforms 53, 55, 57, and 59, and that can compensate for any local distortion on the digital signals. For example, the digital compensation filter 54 can compensate for electrical circuitry bandwidth of the coherent receiver 32, the coherent transmitter 36, or both. The digital compensation filter 54 can also compensate for other linear effects. Compensation may be performed in either the time domain or the frequency domain. The digital compensation filter 54 generates four compensated digital signals 56, 58, 60, and 62. The compensated digital signal 56 is that of the in-phase, horizontal polarization component of the electric field of the input optical signal; the compensated digital signal 58 is that of the quadrature-phase, horizontal polarization component of the electric field of the input optical signal; the compensated digital signal 60 is that of the in-phase, vertical polarization component of the electric field of the input optical signal; and the compensated digital signal 62 is that of the quadrature-phase, vertical polarization component of the electric field of the input optical signal.

The compensated digital signals 56, 58, 60, and 62 are fed to respective digital-to-analog converters (DACs) 64. Each DAC 64 converts a compensated digital signal into an analog signal. The analog signals output by the DACs 64 can be filtered by a plurality of output filters 66 to become filtered output signals, which may then feed into an electrical-to-optical (EO) converter 68. The filters include radio frequency (RF) drivers. The EO converter 68 can generate an output optical signal 70 that is a function of the analog signals output by the output filters 66. Further, the optical signal 70 output by the EO converter 68 can be at a wavelength different than that of the input optical signal 40.

In a sense, the received waveform at one wavelength may be converted to another wavelength via a "copy" and "paste" process.

In some instances, the input optical signal 40 will have a pilot tone identifying the wavelength of the input optical signal. The electric field components of the optical signal modulated by a pilot tone signal, or of the electrical signal representing the optical input signal modulated by the pilot tone signal, can be expressed, in the time domain, as:

$$E_{hi}^{PT}(t)=[1+m\times\cos(1+2\pi f_{PT}t+\varnothing)]E_{hi}(t); \quad \text{equation 1}$$

$$E_{hq}^{PT}(t)=[1+m\times\cos(1+2\pi f_{PT}t+\varnothing)]E_{hq}(t); \quad \text{equation 2}$$

$$E_{vi}^{PT}(t)=[1+m\times\cos(1+2\pi f_{PT}t+\varnothing)]E_{vi}(t); \quad \text{equation 3}$$

$$E_{vq}^{PT}(t)=[1+m\times\cos(1+2\pi f_{PT}t+\varnothing)]E_{vq}(t); \quad \text{equation 4}$$

$E_{hi}$ is the in-phase, horizontal polarization component of the electric field of the optical data signal; $E_{hq}$ is the quadrature-phase, horizontal polarization component of the electric field of the optical data signal; $E_{vi}$ is the in-phase, vertical polarization component of the electric field of the optical data signal; and $E_{vq}$ is the quadrature-phase, vertical polarization component of the electric field of the optical data signal. m is a modulation depth factor and has a value that is less than 1 (e.g., m=0.01). $f_{PT}$ is the pilot tone frequency. $\varnothing$ is a phase factor. t is time. The pilot tone frequency is set in accordance with the wavelength of the optical data signal. For example, there can be pre-determined optical data signal wavelengths that each has associated thereto a specific pilot tone frequency. The four equations above can be re-written simply as:

$$E_{k}^{PT}(t)=[1+m\times\cos(1+2\pi f_{PT}t+\varnothing)]E_{k}(t); \quad \text{equation 5}$$

where k=hi, hq, vi, or vq.

The electric fields of four digital signals or waveforms 53, 55, 57, and 59 output from the ADCs 52 also have the same form as represented by equation 5.

As stated above with respect to FIG. 1, the prior art wavelength converter 30 will not change the pilot tone frequency even when the electrical-to-optical converter 68 outputs the output optical signal 70 at a wavelength different than that of the input optical signal 40. That is, the pilot tone frequency of the output optical signal 70 will be the same as the pilot tone frequency of the input optical signal 40, even though the input and output optical signal may have different optical wavelengths. This can lead to a misidentification of the wavelength of the output optical signal 70 downstream from the wavelength converter 30 and to incorrect processing of the output optical signal 70. The following shows how this can be resolved.

Figure 2:
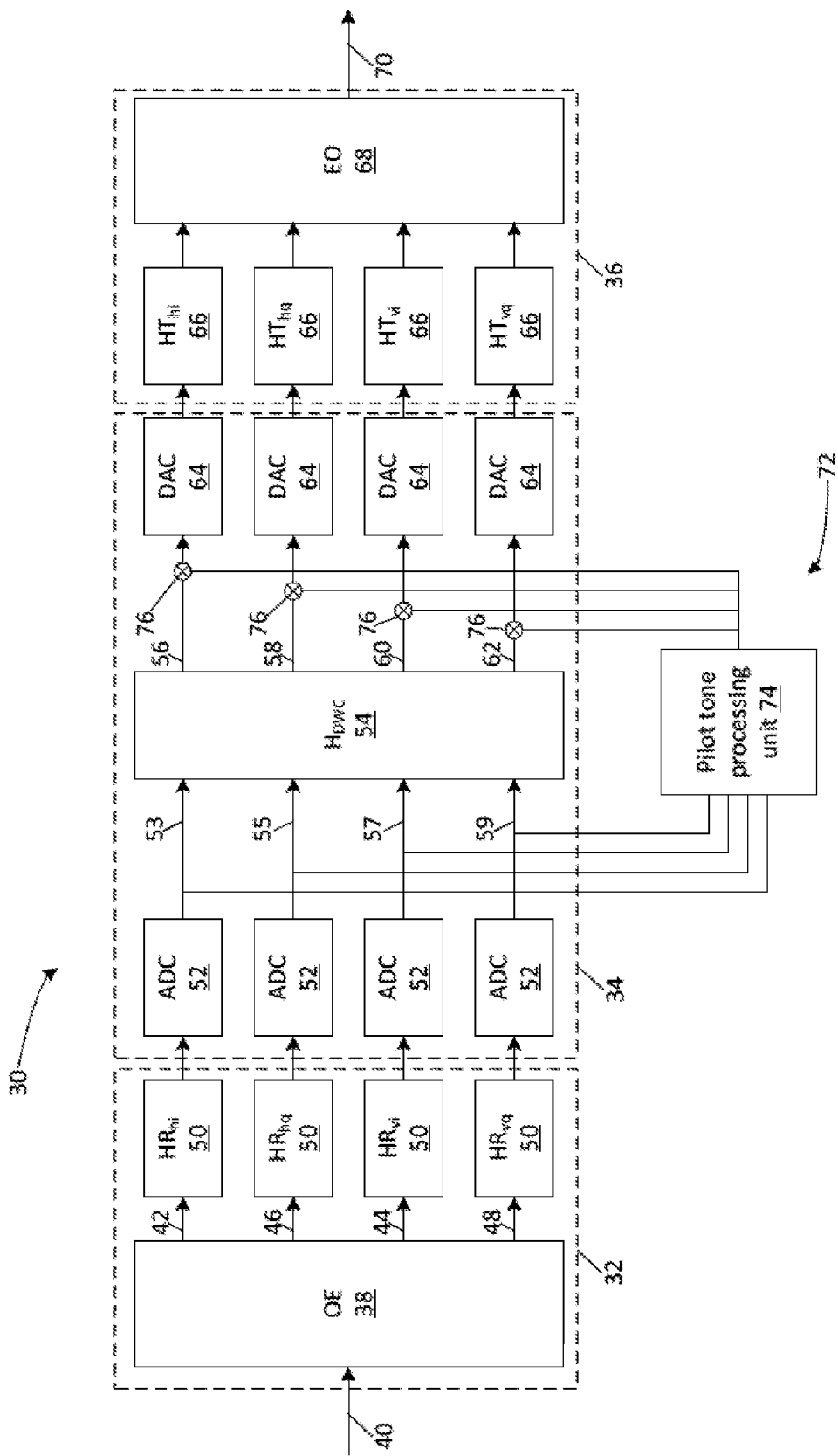
FIG. 2 shows an embodiment of a pilot tone processing apparatus in accordance with the present disclosure.

FIG. 2 shows an embodiment of a pilot tone processing apparatus in accordance with the present disclosure. The pilot tone processing apparatus 72 comprises a pilot tone processing unit 74, which can be a digital signal processing (DSP) unit or an application-specific integrated circuit (ASIC). The pilot tone processing unit 74 receives the waveforms or digital signals 53, 55, 57, and 59 from the four ADCs 52 and outputs a cancelling factor that, as will be described below, can be used to ensure that the pilot tone of the input optical signal 40 does not appear in the output optical signal 70. The pilot tone processing apparatus 72 also comprises multipliers 76 that multiply the cancelling factor generated by the pilot tone processing unit 74 with the four compensated digital signals 56, 58, 60, and 62. The output of the multipliers 76 is fed to the DACs 64.

The pilot tone processing unit 74 can process the four waveforms 53, 55, 57, and 59, obtained from the four ADCs 52, to calculate the values of the modulation depth factor m, the pilot tone frequency $f_{PT}$, and the phase factor Ø of the optical signal modulated by a pilot tone signal, and to obtain the aforementioned cancelling factor that, when multiplied with the four compensated digital signals 56, 58, 60, and 62, can remove the pilot tone from the output optical signal 70.

Figure 3:
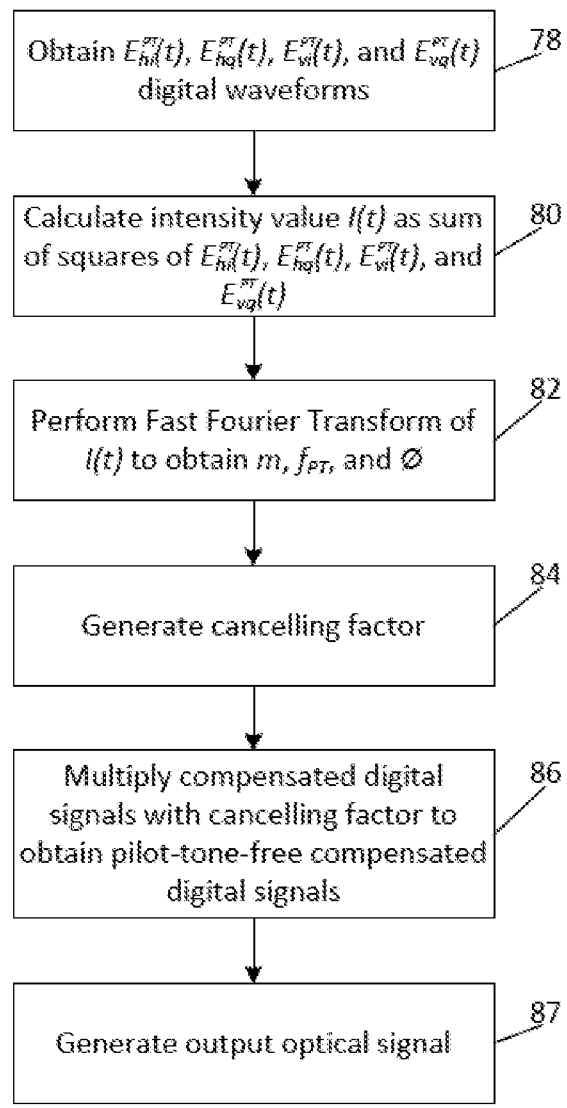
FIG. 3 shows a flowchart of an embodiment of a method of the present disclosure.

The processing of the four waveforms 53, 55, 57, and 59 can be achieved, for example, in accordance with FIG. 3, which is a flowchart of an embodiment of method of the present disclosure. At action 78, the pilot tone processing unit 74 obtains (e.g., receives) the four digital waveforms 53, 55, 57, and 59 from the ADCs 52. At action 80, an intensity signal I(t) of the optical signal is calculated as:

$$I(t)=[E_{hi}^{PT}(t)]^2+[E_{hq}^{PT}(t)]^2+[E_{vq}^{PT}(t)]^2; \quad \text{equation 6}$$

Subsequently, at action 82, a Fast Fourier Transform of I(t) can be performed to obtain the modulation depth factor m, the pilot tone frequency $f_{PT}$, and the phase factor Ø. In order to reduce the number of data points to be processed by the pilot tone processing unit 74, block averaging or sliding window averaging can be applied before performing the Fast Fourier Transform. Any other suitable type of transform of I(t), to obtain m, $f_{PT}$, and Ø can be performed. Such transforms include, for example wavelet transforms and discrete sine transform. Once these values have been obtained, the pilot tone processing unit 74 generates, at action 84, a cancelling factor, which is used to remove the pilot tone from the output optical signal 70. The cancelling factor is:

$$\text{Cancelling factor}=1-m\times\cos(1+2\pi f_{PT}t+\varnothing); \quad \text{equation 7}$$

At action 86, the compensated digital signals 56, 58, 60, and 62, which can be represented the time-varying equation 5, are multiplied by the cancelling factor of equation 8, which yields:

$$E'_k(t)=[1-m\times\cos(1+2\pi f_{PT}t+\varnothing)][1+m\times\cos(1+2\pi f_{PT}t+\varnothing)]E_k(t)=E_k(t)-m^2\times[\cos(1+2\pi f_{PT}t+\varnothing)]^2; \quad \text{equation 8}$$

which, as "m" is less (or much less) than one, can be approximated as:

$$E'_k(t)=E_k(t); \quad \text{equation 9}$$

which is free from any pilot tone component.

Subsequent the multiplication of the compensated digital signal by the cancelling factor, the pilot-tone-free compensated digital signals can be used to generate, at action 87, an output optical signal that will also be pilot-tone-free. That is, the pilot-tone-free compensated digital signals are fed to the DACs 64, which output analog signals to electrical-to-optical converter, which in turn generates the output optical signal as function of the signals received from the DACs 64.

The method of FIG. 3 may be implemented in different ways. One of the implementation is shown at FIG. 4.

Figure 4:
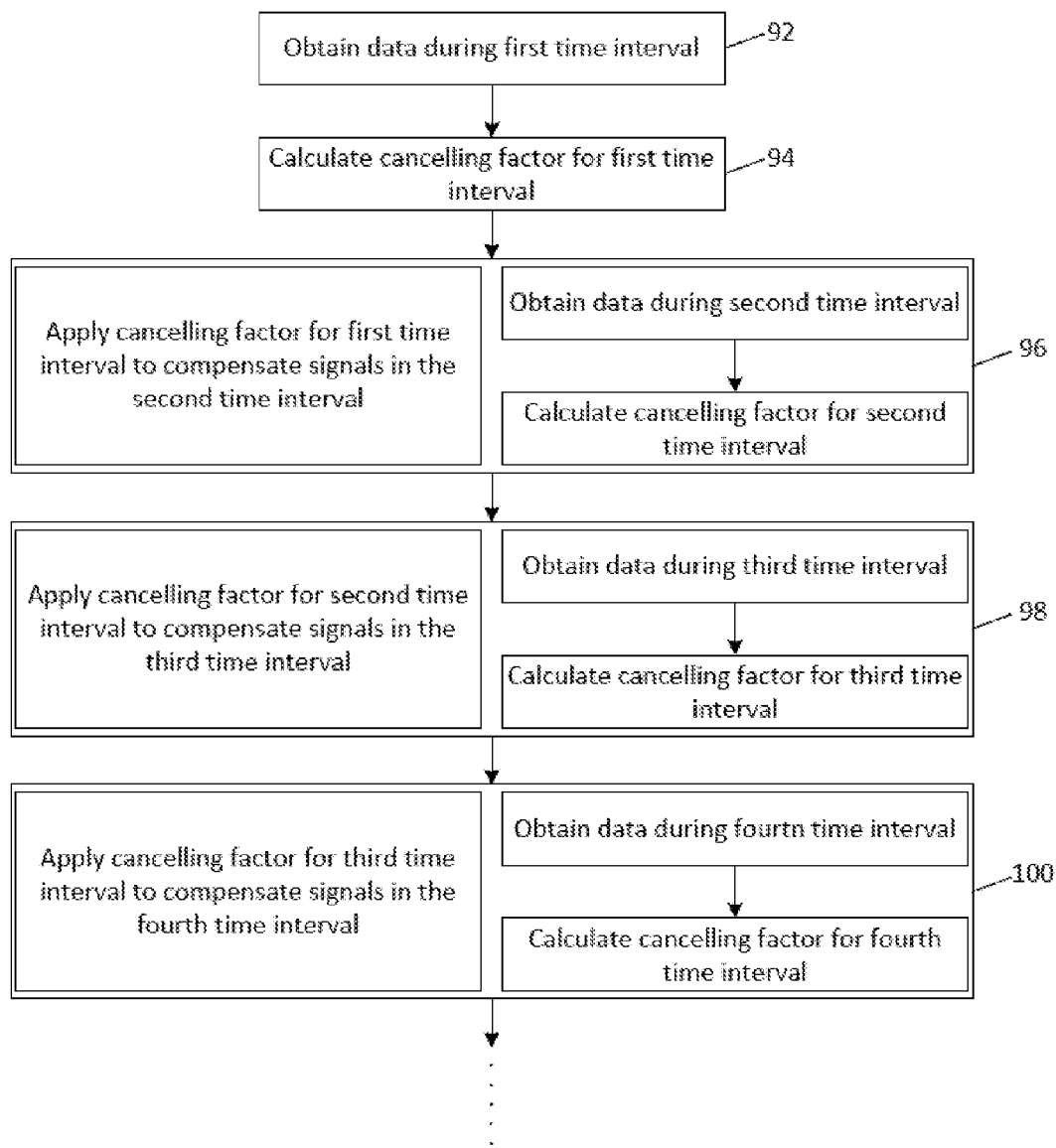
FIG. 4 shows an example implementation of the method of shown in the flowchart of FIG. 3.

In FIG. 4, at action 92, during a first time interval, the waveforms 53, 55, 57, and 59, output from the ADSs 52 are obtained by the pilot tone processing unit 74.

At action 94, the waveforms of the first time interval are processed to obtain the cancelling factor for the first time interval. At action 96, during a second time interval, the cancelling factor obtained for the first time interval is applied to the compensated signals 56, 58, 60, and 62 present during the second time interval. Also during the second time interval, the waveforms 53, 55, 57, and 59, output from the ADCs 52 are obtained by the pilot tone processing unit 74 and, subsequently, the cancelling factor for the second time interval is calculated.

At action 98, during a third time interval, the cancelling factor obtained for the second time interval is applied to the compensated signals 56, 58, 60, and 62 present in the third time interval. Also during the third time interval, the waveforms 53, 55, 57, and 59 output from the ADCs 52 are obtained by the pilot tone processing unit 74 and, subsequently, the cancelling factor for the third time interval is calculated.

At action 100, during a fourth time interval, the cancelling factor obtained for the third time interval is applied to the compensated signals 56, 58, 60, and 62 present in the fourth time interval. Also during the fourth time interval, the waveforms 53, 55, 57, and 59, output from the ADCs 52 are obtained by the pilot tone processing unit 74 and, subsequently, the cancelling factor for the fourth time interval is calculated. Subsequently, the method continues to proceed with the same pattern of actions, which means that data acquired (obtained) during a given time interval is processed to obtain a cancelling factor, which is applied to data present in a subsequent time interval.

Figure 5A:
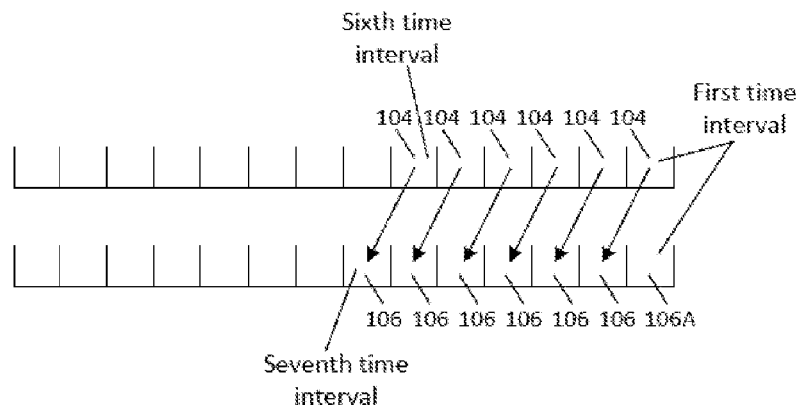
FIG. 5A shows a relation between time intervals during which waveforms can be acquired and processed, and time intervals during which a pilot tone can be removed from the waveforms.

FIG. 5A shows a series of time intervals 104 within which the four waveforms 53, 55, 57, and 59 are obtained by the pilot tone processing unit 74, and another series of time intervals 106 within which the compensated digital signals 56, 58, 60, and 62, are multiplied by the cancelling factor obtained in accordance with the four waveforms 53, 55, 57, and 59 of the previous time interval. As shown in FIG. 5A, removal of the pilot tone from the compensated digital signals 56, 58, 60, and 62 in the first time interval 106A is not possible. The reason is that the cancelling factor for the first time interval is yet to be determined at the time the compensated digital signals 56, 58, 60, and 62 are ready for being multiplied by the cancelling factor.

Figure 5B:
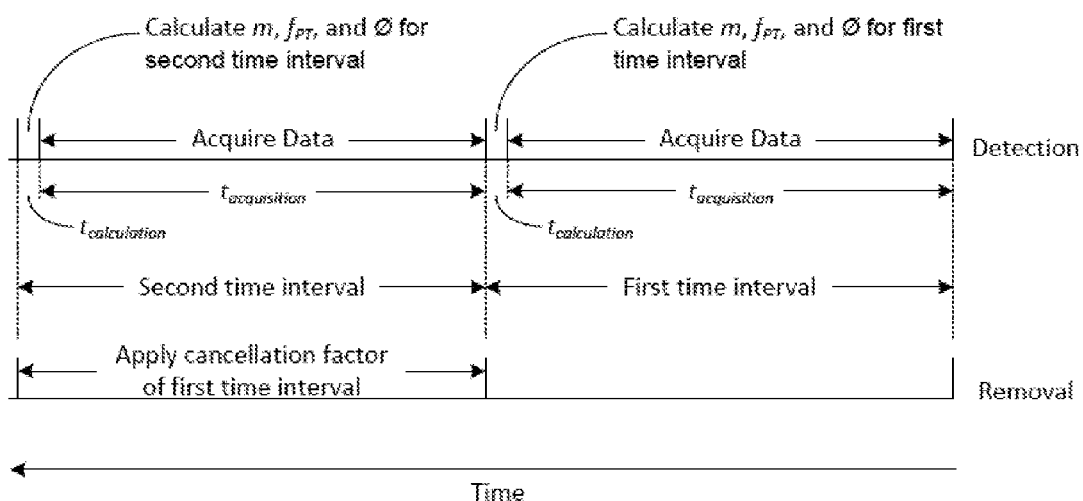
FIG. 5B shows a detailed view of the first and second time intervals of FIG. 5A.

FIG. 5B shows an expanded view of the first and second time intervals of FIG. 5A. As shown at FIG. 5B, the acquisition of the waveforms occurs during an acquisition time $t_{acquisiton}$ and the calculation of the cancelling factor for the first time interval is done during a calculation time $t_{calculation}$. The sum of the acquisition time $t_{acquisiton}$ and of the calculation time $t_{calculation}$ is equal to the duration of the first time interval. The calculation of the cancelling factor includes determining m, $f_{PT}$, and Ø. However, as there is a time delay (equal to $t_{calculation}$) between the end of the acquisition of data during the first time interval and the application of the cancellation factor in the second time interval, the phase Ø is adjusted to account for the time delay. This leads to an adjusted phase:

$$\varnothing_{adjusted}=\varnothing+2\pi f_{PT}(t_{acquisition}+t_{calculation}); \quad \text{equation 10}$$

Figure 6:
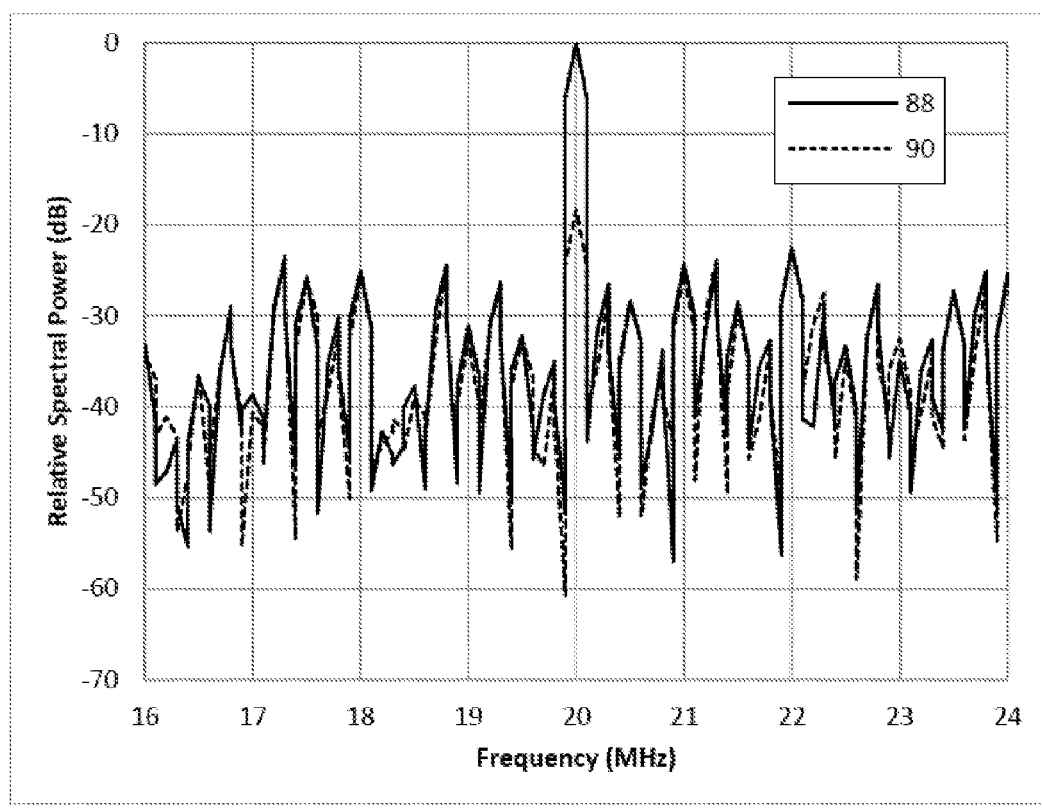
FIG. 6 shows a graph of relative spectral power as a function of frequency before and after removal of a 20 MHz pilot tone.

FIG. 6 shows a graph of relative spectral power as a function of frequency. The graph of FIG. 6 has a plot 88 that shows a 20 MHz pilot tone associated with an optical signal and a plot 90 obtained after the application of the method of FIG. 3. The 20 MHz pilot tone is essentially absent from the plot 90, which shows the applicability of equation 10 and of the implementation of FIG. 4.

In another embodiment, instead of processing waveform data from a time interval to cancel the pilot tone present in the next time interval, the waveform data of a time interval can be processed to cancel the pilot tone present in the same time interval. To do so, the four waveforms 53, 55, 57, and 59 can be buffered in a memory, in time interval bins, and be processed to obtain m, $f_{PT}$, and Ø, which can be applied to the same time interval bin. This approach requires a large buffer and adds latency.

As mentioned above, the obtention of waveforms 53, 55, 57, and 59 at actions 92-102 is carried out over a certain time duration or interval. The longer the time duration is, the greater the signal-to-noise ratio of I(t) at action 80 will be and, the more accurate will be the m, $f_{PT}$, and Ø values obtained at action 82. However, an excessively long time duration will lead to inadequate pilot tone suppression.

In the embodiment of FIG. 2, the pilot tone removal system obtains, at the pilot tone processing unit 74, the four waveforms 53, 55, 57, and 59 and proceeds to calculate a cancellation factor, which is used to remove the pilot tone. However, it is not essential to obtain all four waveforms in order to remove the pilot tone. In fact it is still possible to remove the pilot tone from the input optical signal by using only one of the four waveforms, or only two of the four waveforms, or only three of the four waveforms. In the case where only one of the four waveform is obtained, the intensity signal, instead of being as written in equation 6, will simply be:

$$I(t) = [E_k^{PT}(t)]^2; \quad \text{equation 11}$$

where k=hi (waveform 53), hq (waveform 55), vi (waveform 57), or vq (waveform 59).

In the case where only two of the four waveform are obtained, the intensity signal, instead of being as written in equation 7, will simply be:

$$I(t) = [E_a^{PT}(t)]^2 + [E_b^{PT}(t)]^2; \quad \text{equation 12}$$

where a and b are selected from hi (waveform 53), hq (waveform 55), vi (waveform 57), or vq (waveform 59), and a is different than b.

In the case where only three of the four waveform are obtained, the intensity signal, instead of being as written in equation 7, will simply be:

$$I(t) = [E_a^{PT}(t)]^2 + [E_b^{PT}(t)]^2 + [E_c^{PT}(t)]^2; \quad \text{equation 13}$$

where a, b, and c are selected from hi (waveform 53), hq (waveform 55), vi (waveform 57), or vq (waveform 59), and a is different than b, a is different than c, and b is different than c.

Figure 7:
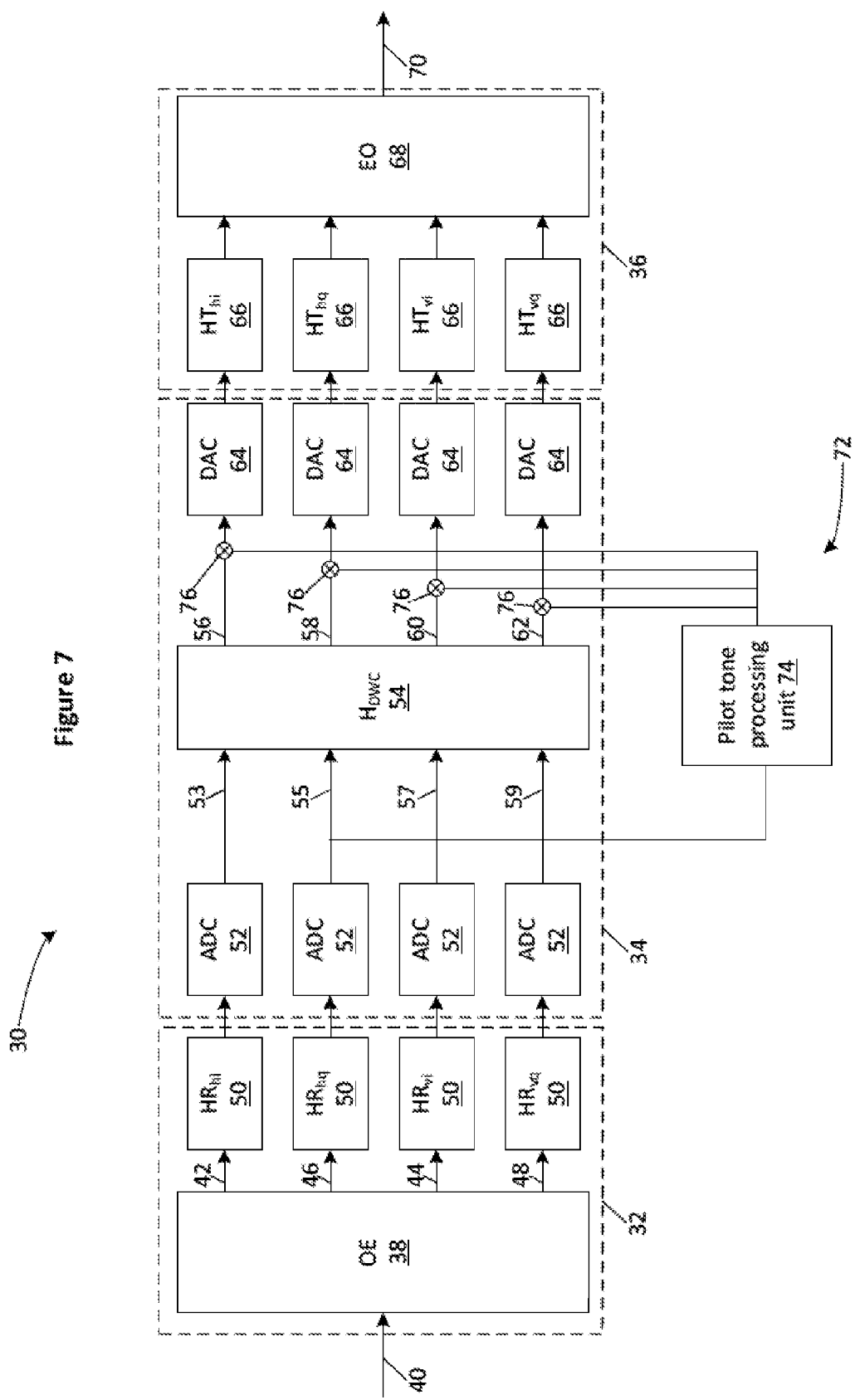
FIG. 7 shows another embodiment of a pilot tone removal system in accordance with the present disclosure.

The signal to noise ratio of the intensity signal, and the accuracy of the modulation depth factor m, the pilot tone frequency $f_{PT}$, and the phase factor Ø will be better when all four waveforms are obtained instead of when only one, two, or three of the waveforms are obtained. FIG. 7 shows another embodiment of a pilot tone removal system in accordance with the present disclosure. The embodiment of FIG. 7 is the same as that of FIG. 2, except that in the embodiment of FIG. 7, only one of the four waveforms is obtained by the pilot tone processing unit 74. In FIG. 7, only waveform 55 is obtained.

Figure 8:
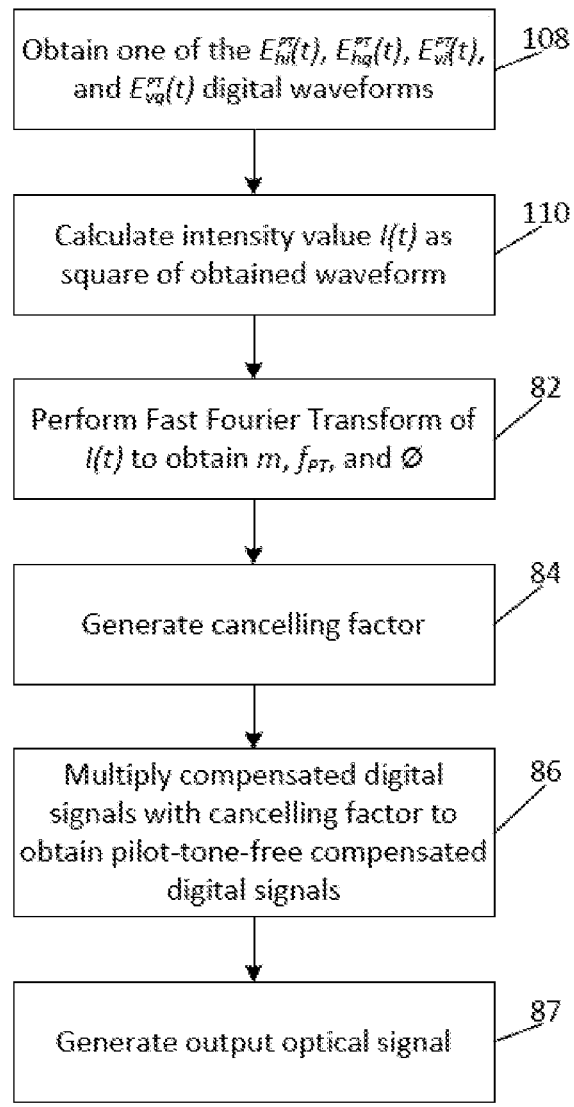
FIG. 8 shows a flowchart of another embodiment of a method of the present disclosure.

FIG. 8 shows a flowchart of an embodiment of method of the present disclosure. FIG. 8 is the same as FIG. 3 except that at action 108 only one of the four waveforms is obtained and, at action 110, the intensity value is calculated as the square of the obtained waveform. The steps 82, 84, 86, and 87 in FIG. 8 are the same as steps 82, 84, 86, and 87 in FIG. 3.

In some embodiments, once the pilot tone frequency has been determined, it is possible to compare the determined value of the pilot tone frequency against set values of pilot tone frequencies and to correct the determined frequency in accordance with the closest set pilot tone frequency value. As an example, if the determined pilot tone frequency is 20.004 MHz and the closet set pilot tone frequency is 20.000 MHz, then the 20.004 MHz value is replaced with the 20.000 MHz value and the calculation of the cancelling factor is carried with the 20.000 MHz value as well as with the determined values of the "m" and "Ø".

The correction of the determined frequency can be effected by storing a lookup table of standard pilot tone frequencies in a memory operationally connected to the pilot tone processing unit 74 and then have the pilot tone processing unit 74 compare the determined value of the pilot tone frequency with the pilot tone frequency values of the lookup table and to replace the determined pilot tone frequency with a frequency of the lookup table that is the closest to the determined pilot tone frequency.

In some embodiments, the ADCs 52 of FIGS. 2 and 7 will be operating at relatively high frequencies, for example, 30 GHz or 60 GHz or other high frequency value. At such frequencies, the amount of data generated by the ADCs may be too great for the pilot tone processing unit 74 to handle. In such cases, the pilot tone processing unit may be programmed to effect an averaging operation on the data received from the ADCs 52. The averaging operation can be a block-averaging operation where the data arriving from an ADC 52 is considered in block of a pre-determined number of sequential data points. Each block of data received from an ADCs is averaged to a single value. Alternatively, any other suitable type of averaging of the data can be performed. For example, a moving average operation, or a sliding window average operation can be performed instead of the block-averaging operation.

In addition to removing a pilot tone from an optical signal, the present disclosure also relates to adding a pilot tone to the output optical signal. In the example embodiment shown at FIG. 2, the process of adding a pilot tone can be carried out at the pilot tone processing unit 74. Adding the a pilot tone can be effected by multiplying the right-hand side of equation 9 with a pilot tone addition factor:

$$\text{pilot tone addition factor} = [1 + m' \times \cos(1 + 2\pi f'_{PT} t + \emptyset')]; \quad \text{equation 14}$$

where m' is the modulation depth factor of the added pilot tone, which is less than one, $f'_{PT}$ is the pilot tone frequency of the added pilot tone, and Ø' is the phase factor of the added pilot tone. Referring back to FIG. 2, the result of multiplying the compensated digital signals 56, 58, 60, and 62, represented by equation 5, by the cancelling factor of equation 8 and by the pilot tone addition factor of equation 14 yields:

$$E''_k(t) = \{E_k(t) - m^2 \times [\cos(1 + 2\pi f_{PT} t + \emptyset)]^2\} \times [1 + m' \times \cos(1 + 2\pi f'_{PT} t + \emptyset')]; \quad \text{equation 15}$$

where k=hi, hq, vi, or vq.

As m and m' will typically have values much smaller than one, equation 15 can be approximated by:

$$E''_k(t) = E_k(t) \times [1 + m' \times \cos(1 + 2\pi f'_{PT} t + \emptyset')]; \quad \text{equation 16}$$

The value for $f'_{PT}$ can be selected from a table of standard pilot tone frequencies, m' can be selected to be any suitably small value, e.g., m'=0.01, and Ø' can be set to any value.

Although the above embodiments relate to removing a pilot tone from an optical signal and adding a pilot tone to an optical signal, the present disclosure also applies to electromagnetic signals in general. Further, even though the waveforms output from ADCs 52 are described as being in-phase and quadrature-phase horizontal and vertical polarization components of the electric field of the optical signal, this need not be the case. In other embodiments, instead of using the in-phase and quadrature-phase components of the horizontal and vertical components of the electric field, it is possible to use the in-phase and quadrature phase polarization component of an electric field of the electromagnetic signal along a first polarization state and along a second polarization state. The first and second polarization states may be perpendicular to each other. In such embodiments, it is possible to have a method for removing a pilot tone from an electromagnetic signal. The method comprises: obtaining at least one of four initial waveforms. Each initial waveform represents one of an in-phase polarization component of an electric field of the electromagnetic signal along a first polarization state, a quadrature-phase polarization component of the electric field along the first polarization state, an in-phase polarization component of the electric field along a second polarization state, and a quadrature-phase polarization component of the electric field along the second polarization state. The method further comprises calculating an intensity waveform in accordance with the at least one of four waveforms obtained; processing the intensity waveform to obtain a pilot tone frequency of the pilot tone, a modulation depth of the pilot tone, and a phase of the pilot tone; and multiplying four compensated waveforms with a pilot tone cancellation factor, the pilot tone cancellation factor being a function of the pilot tone frequency, the modulation depth, and the phase of the electromagnetic signal, each individual compensated waveform being a function of respective one of the four initial waveforms.

Figure 9:
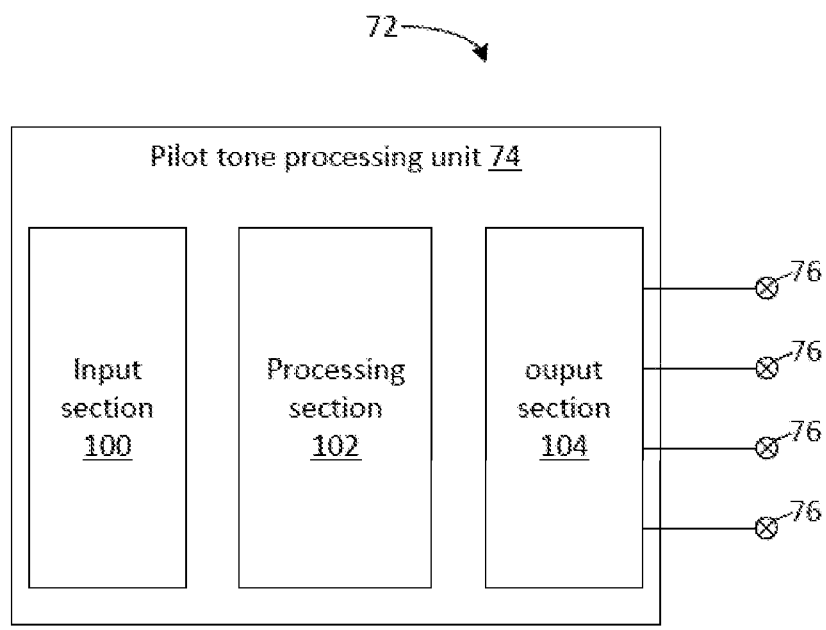
FIG. 9 shows another embodiment of a pilot tone processing apparatus in accordance with the present disclosure.

FIG. 9 show an example embodiment of a pilot tone processing apparatus 72 in accordance with the present disclosure. The pilot tone processing apparatus comprises a pilot tone processing unit 74 and multipliers 76. The pilot tone processing unit has an input section 100, a processing section 102, and an output section 104.

With reference to FIG. 9 and FIG. 2, the input section 100 can obtain one or more of waveforms 53, 55, 57, and 59. The received waveforms are provided to the processing section 102, which calculates an intensity function or waveform as a summation of the squares of the received waveforms. The processing section 100 processes the intensity waveform to extract the modulation depth, the pilot tone frequency, and the phase of the pilot tone present in the waveforms 53, 55, 57, and 59. The processing section 102 then calculates a pilot tone cancelling factor, which is provided to the output section 104. The output section 104 provides the cancelling factor to each multiplier 76, which respectively multiplies one of the four compensated digital signals 56, 58, 60, and 62.

The processing section can also add a new pilot tone to an output optical signal by receiving, at the input section 100, parameters of the new pilot tone or, the parameters can be pre-programmed in the processing section 102. The parameters include a modulation depth of the new pilot tone, a frequency of the new pilot tone, and a phase of the new pilot tone. The received parameters are provided to the processing section 102, which generates an output pilot tone factor and multiplies the waveforms 53, 55, 57, and 59 with the output pilot tone factor and with the cancelling factor. The output section 104 provides the multiplication result to each multiplier 76, which respectively multiplies one of the four compensated digital signals 56, 58, 60, and 62.

In summary, the present disclosure provides a method and system for removing a pilot tone from an optical data signal. The method and system are applied to digital wavelength converters that convert, independently of the format in which optical data may be formatted, an input waveform at a first wavelength to an output waveform at a second wavelength. When operating in an environment where an input waveform has a pilot tone associated thereto, the method and system of the present disclosure allows for the removal of the pilot tone from the input waveform, and also allows for the addition of another pilot to the output waveform. This other pilot tone correctly identifies the wavelength of the output waveform. Advantageously, the method and system of the present disclosure allows digital wavelength converters that convert, independently of the format in which optical data may be formatted, an input waveform at a first wavelength to an output waveform at a second wavelength, to work with optical-electrical-optical regeneration systems that need to extract the data signal from an input waveform before generating an output waveform at another wavelength.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for removing a pilot tone from an optical signal, the method comprising:
 obtaining at least one initial waveform;
 calculating an intensity waveform in accordance with the at least one initial waveform;
 processing the intensity waveform to obtain a pilot tone frequency of the pilot tone, a modulation depth of the pilot tone, and a phase of the pilot tone; and
 multiplying compensated waveforms with a pilot tone cancellation factor, the pilot tone cancellation factor being a function of the pilot tone frequency, the modulation depth, and the phase of the optical signal.

2. The method of claim 1 wherein:
 obtaining at least one initial waveform includes obtaining at least one of four initial waveforms, each initial waveform representing one of an in-phase horizontal polarization component of an electric field of the optical signal, a quadrature-phase horizontal polarization component of the electric field, an in-phase vertical polarization component of the polarization component of the electric field, and a quadrature-phase vertical polarization component of the electric field;
there are four compensated waveforms; and
each individual compensated waveform is a function of a respective one of the four initial waveforms.

3. The method of claim 2 wherein all four initial waveforms are obtained.

4. The method of claim 1 wherein the intensity waveform is equal to the sum of the squares of each initial waveform obtained.

5. The method of claim 1 wherein processing the intensity waveform includes performing a Fourier transform of the intensity waveform.

6. The method of claim 1 wherein processing the intensity waveform includes performing a wavelet transform of the intensity waveform.

7. The method of claim 1 wherein processing the intensity waveform includes performing a discrete sine transform of the intensity waveform.

8. The method of claim 1 wherein the cancellation factor is equal to: $1-m \times \cos(1+2\pi f_{PT}t+\varnothing)$, m being the modulation depth of the pilot tone, $f_{PT}$ being the pilot tone frequency, $\varnothing$ being the phase of the pilot tone, and t being time.

9. The method of claim 1 wherein:
obtaining the at least one initial waveform, calculating the intensity waveform, and processing the intensity waveform occurs during a first time interval; and
multiplying the compensated waveforms with the pilot tone cancellation factor occurs in a subsequent time interval.

10. The method of claim 1 wherein processing the intensity waveform to obtain a pilot tone frequency includes calculating the pilot tone frequency to obtain a calculated pilot tone frequency, and correcting the calculated pilot tone frequency in accordance with a set of pre-determined pilot tone frequencies.

11. The method of claim 1 wherein the compensated waveforms multiplied by the pilot tone cancellation are modified compensated waveforms, the method further comprising converting the modified compensated waveforms into an output optical signal.

12. The method of claim 11 further comprising, prior to converting the modified compensated waveforms into the output optical signal, adding an output pilot tone to the output optical signal.

13. The method of claim 12 wherein adding the output pilot tone to the output optical signal includes multiplying the modified compensated waveforms with an optical tone addition factor equal to: $1+m' \times \cos(1+2\pi f'_{PT}t+\varnothing')$, where m' is a modulation depth of the output pilot tone, $f'_{PT}$ is the frequency of the output pilot tone, $\varnothing'$ is the phase of the output pilot tone, and t is time.

14. An apparatus for removing a pilot tone from an optical signal, the apparatus comprising:
a pilot tone processing unit having an input section, a processing section, and an output section,
the input section to obtain at least one initial waveform,
the processing section to calculate an intensity waveform in accordance with the at least one initial waveform, to process the intensity waveform to obtain a pilot tone frequency of the pilot tone, a modulation depth of the pilot tone, and a phase of the pilot tone, and to calculate a pilot tone cancellation factor as a function of the pilot tone frequency, the modulation depth, and the phase, and the output section to output the pilot tone cancellation factor; and
multipliers to receive the pilot tone cancellation factor and to multiply compensated waveforms with the pilot tone cancellation factor.

15. The apparatus of claim 14 wherein:
the input section is to obtain at least one of four initial waveforms, each initial waveform representing one of an in-phase horizontal polarization component of an electric field of the optical signal, a quadrature-phase horizontal polarization component of the electric field, an in-phase vertical polarization component of the polarization component of the electric field, and a quadrature-phase vertical polarization component of the electric field;
the multipliers are to multiply four compensated waveforms with the pilot tone cancellation factor; and
each individual compensated waveform is a function of a respective one of the four initial waveforms.

16. The apparatus of claim 15 wherein the input section is to obtain all four initial waveforms.

17. The apparatus of claim 14 wherein the processing section calculates the intensity waveform as a sum of the squares of each initial waveform obtained.

18. The apparatus of claim 14 wherein the processing section processes the intensity waveform by performing a Fourier transform of the intensity waveform.

19. The apparatus of claim 14 wherein the processing section processes the intensity waveform by performing a wavelet transform of the intensity waveform.

20. The apparatus of claim 14 wherein the processing section processes the intensity waveform by performing a discrete sine transform of the intensity waveform.

21. The apparatus of claim 14 wherein the processing section calculates the cancellation factor as being equal to $1-m \times \cos(1+2\pi f_{PT}t+\varnothing)$, m being the modulation depth of the pilot tone, $f_{PT}$ being the pilot tone frequency, $\varnothing$ being the phase of the pilot tone, and t being time.

22. The apparatus of claim 14 wherein to process the intensity waveform to obtain a pilot tone frequency of the pilot tone includes calculating the pilot tone frequency to obtain a calculated pilot tone frequency, and correcting the calculated pilot tone frequency in accordance with a set of pre-determined pilot tone frequencies.

23. The apparatus of claim 14 wherein:
the input section obtains the at least one initial waveform during a time interval
the processing section calculates the intensity waveform, processes the intensity waveform, and calculates the pilot tone cancellation factor during the time interval; and
the multipliers multiply the compensated waveforms with the pilot tone cancellation factor during a subsequent time interval.

24. The apparatus of claim 20 wherein:
the processing section generates an output pilot tone function equal to $1+m' \times \cos(1+2\pi f'_{PT}t+\varnothing')$, where m' is a modulation depth of the output pilot tone, $f'_{PT}$ is the frequency of the output pilot tone, $\varnothing'$ is the phase of the output pilot tone, and t is time, and
the output section outputs the output pilot tone function to the multipliers, and
the multipliers multiply the compensated waveforms with the pilot tone cancellation factor and with the output pilot tone function.

* * * * *